(12) United States Patent
Voit

(10) Patent No.: US 6,926,529 B1
(45) Date of Patent: Aug. 9, 2005

(54) TAG-ALONG TEACHER EDUCATIONAL AIDS

(76) Inventor: Lorna B. Voit, 8370 Hwy. 25 NE., Foley, Benton, MN (US) 56329

( * ) Notice: Subject to any disclaimer, the term of this patent is extended or adjusted under 35 U.S.C. 154(b) by 787 days.

(21) Appl. No.: 09/589,866

(22) Filed: Jun. 8, 2000

(51) Int. Cl.$^7$ ................................................ G09B 1/16
(52) U.S. Cl. ..................................... 434/167; 434/171
(58) Field of Search ............................... 434/156, 159, 434/167, 171, 172; 70/456 R, 460; D3/207, D3/208

(56) References Cited

U.S. PATENT DOCUMENTS

| | | | | |
|---|---|---|---|---|
| 209,307 | A | * | 10/1878 | Trickey ...................... 434/156 |
| 335,837 | A | | 2/1886 | Peckham |
| 2,195,042 | A | * | 3/1940 | Wishinsky ................ 70/456 R |
| 2,511,651 | A | * | 6/1950 | Schlitz ......................... 40/323 |
| 2,571,609 | A | * | 10/1951 | Powell ....................... 206/38.1 |
| 2,596,374 | A | * | 5/1952 | Crapster ..................... 116/308 |
| 2,796,680 | A | | 6/1957 | Wittcoff |
| 3,271,882 | A | | 9/1966 | Chuy |
| 3,271,884 | A | | 9/1966 | Roberson |
| 3,583,317 | A | * | 6/1971 | Gibson ......................... 283/98 |
| 3,871,115 | A | | 3/1975 | Glass et al. |
| 4,165,890 | A | | 8/1979 | Leff |
| 4,306,433 | A | * | 12/1981 | Kelly ....................... 70/456 R |
| 4,543,860 | A | * | 10/1985 | Van Meter ................... 81/488 |
| 4,907,904 | A | | 3/1990 | Baldwin |
| 5,131,686 | A | | 7/1992 | Carlson |
| 5,145,377 | A | | 9/1992 | Tarvin et al. |
| D338,103 | S | * | 8/1993 | Eschmann ................... D3/208 |
| 5,312,257 | A | | 5/1994 | Tarvin et al. |
| D348,774 | S | * | 7/1994 | Weber ......................... D3/208 |
| 5,492,473 | A | * | 2/1996 | Shea ......................... 434/156 |
| D370,119 | S | | 5/1996 | McDaniel |
| D389,302 | S | | 1/1998 | Ekeoba |
| D394,746 | S | | 6/1998 | Martin |
| 5,787,745 | A | * | 8/1998 | Chang ..................... 70/456 R |
| D398,773 | S | | 9/1998 | Huang |
| 5,842,722 | A | | 12/1998 | Carlson |
| 5,884,513 | A | * | 3/1999 | Norris ..................... 70/456 R |
| 5,895,219 | A | | 4/1999 | Miller |
| D411,656 | S | | 6/1999 | Wasylyk |
| 6,101,367 | A | * | 8/2000 | Luciano ..................... 434/308 |

* cited by examiner

Primary Examiner—Kien Nguyen
(74) Attorney, Agent, or Firm—Albert W. Watkins

(57) ABSTRACT

Tags that have educational material imprinted thereon are used in combination with a key ring. The key tags are designed to be used singly upon the key ring and changed daily, to assist an adult or child with an educational endeavor such as, for example, learning new vocabulary words. Durable sheet stock such as polymeric or metallic sheet stock, polymer laminates, and coated papers are contemplated for the tag substrate material, as are various reinforcements, dimensions and colors. The tags may be printed or manufactured in volume, or may alternatively be printed on demand from a kit and special stock material.

13 Claims, 1 Drawing Sheet

TAG-ALONG TEACHER EDUCATIONAL AIDS

BACKGROUND OF THE INVENTION

1. Field of the Invention

This invention pertains generally to the field of education, and more specifically to the learning of languages and vocabulary. Most specifically, the invention pertains to a collection of portable key-ring tags that each bear a unique vocabulary word. The invention further pertains to a method of learning new vocabulary.

2. Description of the Related Art

In our modern society of computers, Internet, television, and video products, the mastery of language may be viewed by many as a burden and an inconvenience. While the value of this skill is without question, adequate tools needed for an adult to actively expand vocabulary are not readily available in our present society. Only limited efforts have been made to assist the general public with vocabulary training. While no doubt of value, these programs or efforts tend to reach few people, and encounter only limited success. For example, several widely reviewed publications are known to print vocabulary lists on a monthly basis. While many readers review these lists, all too often the lists are used strictly for short-term entertainment. To see a new vocabulary list a single time will rarely provide a person with the exposure and training necessary to incorporate new words from the list into everyday vocabulary. Instead, the lists fall more into the category of interesting trivia, where one person will ask another if they know what a more unusual word may mean. While this is a positive side effect, since several people may then be exposed to the word, the exposure is simply too limited in most cases to be of lasting value. Furthermore, the publication will be closed and never reviewed again, so a person will only be exposed to this list of ten or twenty words once or twice, never again to see the words. In most cases, the person will never have the opportunity to use the word in actual written or spoken communications with others.

In more structured environments, such as educational classrooms, a variety of word lists and work books have been prepared for teaching vocabulary. One common classroom method begins with the highly structured pre-testing of vocabulary, followed by a study of new or challenging words such as with work sheets or homework problems, and then post-testing. The word lists may be found in bound texts, or on loose work sheets. While this approach has been used successfully with a large number of students, and tends to teach a large vocabulary in a relatively short period of time, this technique is only practical where the students have significant time available for classroom and study. Furthermore, the technique is unpleasant for many people.

Several popular games have been created that offer people more opportunities to learn vocabulary in a more relaxed and entertaining setting. Among these are well-known games that offer real words and definitions, together with opportunities for participants to create either imaginary words or imaginary definitions. Then the participants must try to identify the real word or definition. Unfortunately, and much like the word lists referred to above, the words are rarely seen more than once or twice, and when they are seen multiple times by the players, the alternatives that the players create as a part of the game tend to obfuscate one's memory of the real word and definition. Consequently, many of these games have only limited value in expanding vocabulary.

Educational tools have been illustrated in various patents that assist with vocabulary training. For example, Miller, in U.S. Pat. No. 5,895,219 incorporated herein by reference, illustrates a ring binder with pages having partially printed sentences, and spaces for attaching Velcro-backed words and pictures that can be used to complete the sentences. A child will read a sentence and then select pictures and words to complete the sentence. This book is primarily directed towards new readers, and is relatively bulky. The concept may perform well in a fixed location such as a classroom, but once again this concept is limited then to students who are able to dedicate larger amounts of time during a day to studies and where the book can remain safe and protected within the confines of the classroom environment. Outside of the classroom, pieces get lost, Velcro gets clogged with lint or dust, and water may damage the book.

Bell, in U.S. Pat. No. 202,692 also incorporated herein by reference, illustrates a transparent card having an inquiry printed on the face of the card. When the card is held up to a light, a word or picture will be provided responsive to or explanatory of the inquiry. This type of educational aid offers a relatively large selection of vocabulary words and more repetitive development of each word. Unfortunately, the cards are also not particularly portable, owing to the probability for loss or damage. The effort of picking up a dropped card deck just one time will curb many people's desires to develop their vocabulary using cards such as these disclosed in Bell.

Roberson, in U.S. Pat. No. 3,271,884 also incorporated herein by reference, illustrates a special work book for teaching foreign languages, including various embodiments therein. This particular work book uses facing pages that include, on one page, words and a picture in both languages and, on an opposite page, words in one language, pictures, and a space for writing in the other language. These work books are illustrative of the prior art text and work books which may be found in a school or a structured instructional course.

Communications tools are illustrated by Glass et al, in U.S. Pat. No. 3,871,115 and Leff, in U.S. Pat. No. 4,165,890, each also incorporated herein by reference. In Glass et al, index tab words and pictograms are combined to assist a person trying to communicate in foreign languages with others. This booklet is designed for use, for example, by a traveler in a foreign land, and is bulky. Use beyond this purpose will be hampered by the size of the book and the inherent limitation on the numbers of words that can be associated with this type of book.

Peckham, in U.S. Pat. No. 335,837 incorporated herein by reference, illustrates a teaching aid primarily for children. A collection of disks or tablets is provided that extends about a closed ring. Each disk or tablet may include an inquiry upon one side and a response or reply upon the other. The ring is a closed ring, which thereby permits the educational device to be used by children in a relatively unsupervised manner. However, and as aforementioned, a number of prior art teaching techniques are already available for younger persons. The Peckham invention is therefore serving a group of people already being accommodated by a significant school period for study and where the physical bulk of a teaching device is not an issue. What is needed instead is a teaching device which is designed for both adults and children alike that may be omni-present, unobtrusive, durable, self-paced, readily expanded, easily manufactured, and compactly packaged.

SUMMARY OF THE INVENTION

In a first manifestation, the invention is a portable and unobtrusive educational apparatus which provides self-paced instruction. A key ring which prevents inadvertent attachment or removal of keys while permitting intentional insertion or removal is provided. An educational key tag is also attached to the key ring and displays an educational challenge. By forming the key tag from commonly available sheet stock, the invention may be easily and flexibly manufactured, and also packaged compactly. The apparatus is carried by an adult or child without requiring special accommodation or space.

In a second manifestation, the invention is a method for expanding vocabulary. Vocabulary words are identified, and then imprinted onto tags. One of the tags is selected and inserting onto a key ring. The key ring will then be stored until an attached key is needed or the key ring is used for another purpose. Then the stored key ring is retrieved, used and the key ring stowed. Between the time the key ring is retrieved and stowed, the owner will study the imprinted tag, thereby exposing the owner to the vocabulary word with each use of the key ring.

In a third manifestation, the invention is a key set and educational aid for convenient and self-paced education. A spirally wound resilient metal key ring has a fill turn of metal and an additional wrap of metal overlapping the full turn to form a region of overlap. The fill turn and additional wrap are resiliently biased into contact with each other within this region of overlap. A key has a lock engaging body and a head for engaging the key ring. A hole passes through the key head, through which the additional wrap of the key ring may be passed by resiliently biasing the full turn and additional wrap temporarily apart from each other and passing the additional wrap through the hole. A planar tag of standard key size also has a hole, through which the additional wrap may be similarly passed by resiliently biasing the full turn and additional wrap temporarily apart from each other and passing the additional wrap through the tag hole. The planar tag has a word on a first major surface and a definition of the word on a second major surface.

OBJECTS OF THE INVENTION

A first object of the invention is to provide a device that assists with vocabulary expansion or other similar educational pursuit which is omni-present and available to most adults and children throughout the day. A second object of the invention is to be unobtrusive, so that the device may be discretely carried with the person. A third object of the invention is to be sufficiently durable to allow the invention to be carried along with a person without any special cares or precautions, while not adversely affecting the invention. Another object of the invention is to enable a person to independently control the pace of learning. A further object of the invention is to enable expansion of the preferred embodiment to add additional vocabulary words or other educational indicia. Yet another object is for the invention to be easily and flexibly manufactured, as independently as possible of the quantities of the product required. Another object is to be able to pack the invention into compact packaging, which permits efficient warehouse storage, shipment and retail distribution. These and other objects of the invention are achieved in the preferred embodiment, which will be best understood when considered in association with the drawing figures.

DESCRIPTION OF THE PREFERRED EMBODIMENT

Figure 2:
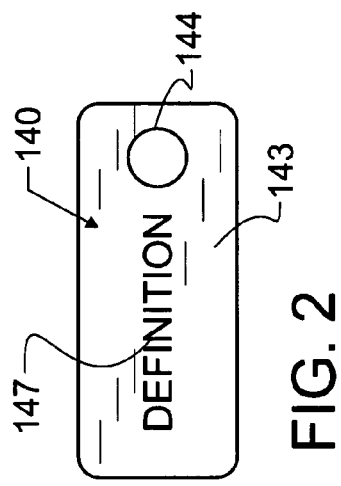
FIG. 2 illustrates a back plan view of the preferred embodiment teaching tag of FIG. 1.

The preferred embodiment educational aid 100 most preferably includes in combination a key ring 110, key 120, and tag 140. One or more additional keys such as key 130 may also be carried by key ring 110. For the purposes of this disclosure, a key will be understood to be an instrument, usually of metal, for moving the bolt of a lock and thus locking or unlocking something. While available in different sizes, standard keys range in size from approximately one to three inches in length, one half to one inch in width, and one thirty-second to one eighth of an inch in thickness. Keys are used by adults and children for many different functions and purposes, ranging from access to buildings, cars, cabinets and the like, to starting various mechanical and electrical devices and appliances, to organizing library and video cards, as well as many other diverse applications. Because of the widespread use of locks for so many various purposes, keys are ubiquitous, carried by nearly every adult in society.

The present invention makes use of the pervasiveness of keys and locks, and the frequency of use of key rings. In a typical day, a person will leave their dwelling and lock the door on the way out. In many instances, this will require the use of a key. Next, the person may walk to an automobile and unlock the door. This will again require a key, even where the key is of the new remote electronic type carried upon a key ring. Next, if the person is an adult of at least the minimum driving age, they will use a key in the ignition switch of the automobile in order to start the engine. Once at work, the person will again use a key, either to open a building, suite, office door or the like to gain access to a work area. Within the work area there may be additional locked areas or cabinets that will again require a key. During a midday break, the person may lock the office, use the automobile, and return to unlock and resume work, accounting for three to five additional uses of the key ring. After work, the person may once again lock the office or work area, use the automobile door and ignition keys, and return home where a key will be needed to re-enter the dwelling. In this scenario, the key ring will be accessed eight different times and keys used eleven times, not counting uses while on the job at work, nor considering additional keys such as health club lockers, recreational vehicles such as snowmobiles, water craft, and other applications where locks are found.

A typical key ring 110 is formed from spring metal and has two overlapping wraps 112, 114. These wraps are resiliently biased into contact with each other to form a closed loop about which keys 120, 130 may slide freely, without leaving the confines of ring 110. While the geometry of key ring 110 is not essential to the working of the invention, this type of key ring 110 is most preferred, since this key ring will not readily detach, thereby ensuring better retention of keys 120, 130 and tag 140. A typical key 120 will have a lock engaging protrusion 126 having pin engaging teeth thereon, which forms the unique association with a particular lock. A head 124 includes a hole or slot 122 cut therein through which ring 110 may pass. Noteworthy here is the fact that while most keys today are metal, there are additional keys of approximately the same size that are electronic, using various electronic tags or codes and proximity activated tags, wireless radio transmissions or the like to activate an electronic lock. Additional keys may be manufactured from plastics or composite materials. The exact composition or mechanism of operation of keys 120, 130 is not critical to the invention. Rather, the pervasiveness of keys and key rings in society, which leads to their frequency of access, is very important for the full benefit and advantage of the present invention to be realized. As is well known, the expansion of vocabulary comes from repetitive exposure to new words, and key rings are accessed repetitively during a typical day.

Tag 140 will most preferably be dimensioned to approximate the size of a standard key, the dimensions which have been noted herein above. Keys are dimensioned for the convenience of people, so as to be effective but not obtrusive. Likewise, tag 140 will most preferably be unobtrusive, and readily carried or stored in the same places where keys 120, 130 would otherwise be. The composition of tag 140 is not critical to the workings of the invention, though in the most preferred embodiment, tag 140 will be fabricated from a stock material available in sheet or strip form which may be readily printed onto. This material may be a paper or more preferably coated paper stock, card stock or the like, or may alternatively be fabricated from a polymer, composite material, metallic sheet stock and the like. The color of tag 140 is not critical, and various colors and highlights are contemplated that may offer attractiveness or eye-catching appeal. Various plastics are known to have good adhesion to ink, and such materials as polyesters, polycarbonates, vinyls and the like will be suitable. Composites may also be used, as well as various laminates of paper and plastic. Tag 140 may be rigid, semi-rigid or flexible, though it will most preferably not unduly crease and so will offer some degree of resistance to folding, greater than ordinary copy paper for example. Onto a front surface 142 of tag 140 will most preferably be imprinted a vocabulary word 146, and onto a back surface 143 will most preferably be imprinted a definition 147.

Figure 3:
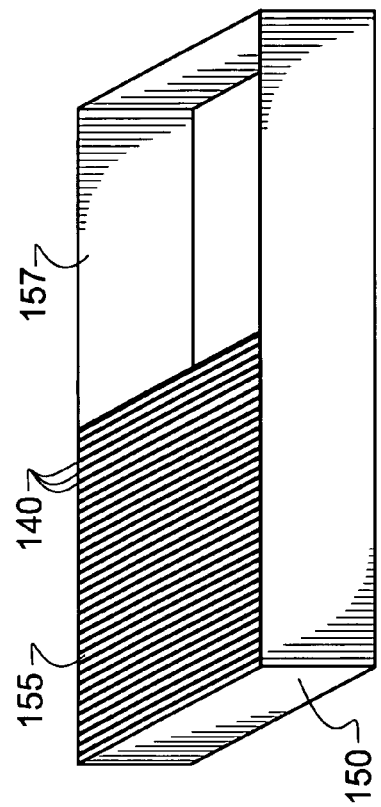
FIG. 3 illustrates an assortment of preferred embodiment teaching tags boxed for storage or shipment.
Figure 1:
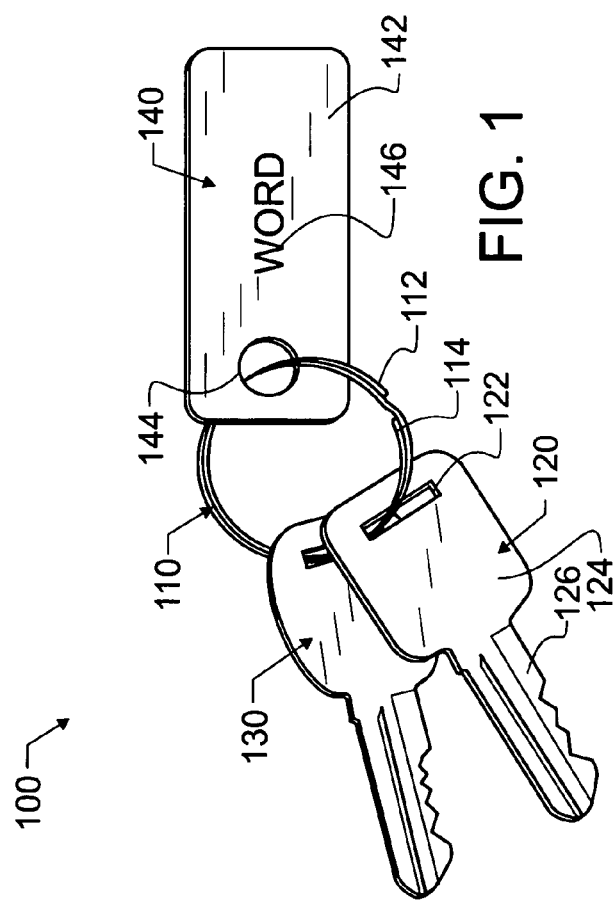
FIG. 1 illustrates the preferred embodiment key ring, keys and teaching tag from a projected plan view.

Manufacture of tag 140 can be accomplished at different volumes of production, depending to some extent upon the materials selected for tag 140. Where higher volumes are contemplated, large sheets or continuous rolls may printed using offset or lithographic printing processes, and individual tags separated later therefrom. For stock materials requiring lamination, this may occur before, during or after the printing process. When a large quantity of tags 140 are manufactured at one time, they will most preferably be packaged into a compact box or container 150. As is apparent from FIG. 3, a large number of tags 140 may be stored in a compact manner for efficient warehousing, shipment and retail shelf space usage. Container 150 will also most preferably include two compartments 155, 157 for storing tags 140. Compartment 155 will most preferably be used for new or unused tags, while second compartment 157 will provide a receptacle for tags that have already been reviewed and learned.

At the other end of the spectrum, tags 140 may be printed individually or in small quantity upon already individually separated stock or on smaller sheets, for example, upon standard letter-size stock. Continuous feed strips or rolls may also be used, in that case requiring severing along only one axis. It is also contemplated herein that the invention may be provided in a kit form, for printing on demand using a personal computer printer or the like. Regardless of the method of manufacture, a selection of words 146 and definitions 147 will need to be identified. The selection of words will, of course, depend in part upon the production method and intended user.

A person using educational aid 100 will select a particular tag 140 and attach tag 140 to ring 110. Using the most preferred embodiment ring 110, which has two wraps of resilient metal, the person will do this in the same way a key 120, 130 will be attached. This is done by slipping an edge of tag 140 between wraps 112 and 114, until hole 144 is aligned with an end of one of the wraps 112, 114. Once hole 144 is aligned, one of wraps 112, 114 may be slid through hole 144, until both wraps pass through hole 144. In order to successfully install tag 140 onto ring 110, it will be preferable that tag 140 be fabricated from a reasonably durable stock material to avoid undue ripping, which might otherwise frustrate a user. When tag 140 has been installed with keys 120, 130 onto ring 110, a person will then carry tag 140 together with keys about in the ordinary way. Typically, educational aid 100 will be placed or stored in a pants pocket or purse, until one of keys 120, 130 are needed to move a lock bolt. At that time, key ring 110 will be retrieved, one of keys 120, 130 used, and key ring 110 stowed again for later use. However, during the period when key ring 110 is taken out of storage, a person will most preferably look at one of either word 146 or definition 147 and recall the other of word 146 or definition 147. This process of reviewing the vocabulary word with each key access will ensure multiple reviews of a particular vocabulary word within each day. The person has the flexibility to determine when to replace tag 140 with a new tag 140 having a different word 146 and definition 147 imprinted thereon. In this way, the expansion of a person's vocabulary may occur at the person's own pace. Noteworthy here is the fact that review of tag 140 occurs frequently enough to become a habit, where a textbook, magazine or the like will more likely be put away on a shelf and never be retrieved again.

Educational aid 100 is most preferably used in association with vocabulary training. The particular vocabulary word 146 can be in any language, and definition 147 may simply be a word in another language or a pictogram or picture. Alternatively, definition 147 may be a full written definition, and may have samples of usage in context. The particular advantage of the invention with vocabulary training is the relatively small amount of time required for reviewing vocabulary word 146 and definition 147, and the frequency of review afforded by multiple access to a key ring during a day. Nevertheless, there will be other opportunities and applications for educational aid 100 that will be apparent to those skilled in the art.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, while the most preferred embodiment method involves a person's review of tag 140 when key ring 110 is otherwise accessed, the invention is not so limited. For example, when an individual is traveling on a bus, walking, exercising, waiting in a line or in an office for a meeting, waiting in traffic, or during any other available time, the tag is available and makes valuable use of what might otherwise be considered wasted time. In particular, in traffic the tag is dangling visibly in front of the driver and passengers, and can be helpful to relieve the tension of otherwise frustrating delays. Therefore, the scope of the invention is set forth and particularly described in the claims hereinbelow.

What is claimed is:

1. A portable and unobtrusive educational apparatus which provides self-paced instruction and which is carried by a person without requiring special accommodation or space, and which may be easily and flexibly manufactured and packaged compactly, comprising the combination of:
   a key which is operative to open a lock and permit access which is otherwise prevented by said lock;
   a key ring which operatively prevents inadvertent attachment or removal of said key while operatively permitting intentional insertion or removal;
   a plurality of educational key tags, each one of said plurality fabricated from a durable and weather resistant planar paper and polymer laminate material having a means for attaching said tag to said key ring which is operatively prevented from inadvertent attachment or removal while operatively permitted intentional attachment or removal from said key ring, said tag additionally presenting an educational challenge displayed on a first surface and presenting an answer appropriate to said challenge, said answer normally concealed when said educational challenge is visible;
   wherein at least one of said plurality of educational key tags is attached to said key ring.

2. The portable and unobtrusive educational apparatus of claim 1 wherein said plurality of educational key tags are further comprised by a reinforced polymeric composition that is both durable and mark resistant.

3. The portable and unobtrusive educational apparatus of claim 1 wherein said educational challenge further comprises a word, and said answer further comprises a definition.

4. The portable and unobtrusive educational apparatus of claim 1 wherein said educational challenge is imprinted upon said paper and polymer laminate.

5. The portable and unobtrusive educational apparatus of claim 4 wherein said educational challenge is imprinted on demand.

6. The portable and unobtrusive educational apparatus of claim 1 further comprising a storage box having an interior for receiving said plurality of educational key tags in stacked arrangement therein.

7. A method for expanding vocabulary, comprising the steps of:
   identifying vocabulary words and definitions that define each of said vocabulary words;
   imprinting said identified vocabulary words onto tags on a first surface thereon, one of said vocabulary words for each one of said tags;
   imprinting said definitions that define said vocabulary words onto said tags on a second surface thereon opposed to said first surface wherein each tag contains at least one vocabulary word and at least one definition that defines said at least one vocabulary word;
   selecting a one of said imprinted tags;
   inserting said selected one imprinted tag onto a key ring together with a key removably attached therewith;
   storing said key ring, said key and said inserted, imprinted tag;
   retrieving said stored key ring;
   transporting said key ring, said key and inserted, imprinted tag through the natural elements without shelter;
   stowing said retrieved key ring; and
   studying said selected one imprinted tag between said step of retrieving and said step of stowing.

8. The method of claim 7 wherein said step of imprinting comprises the step of printing a single tag on demand.

9. The method of claim 7 wherein said step of storing further comprises storing a key with said key ring.

10. The method of claim 9 further comprising the step of using said key on said retrieved key ring between said step of retrieving and said step of stowing.

11. The method of claim 7 wherein said step of imprinting farther comprises imprinting three hundred and sixty five of said words and three hundred and sixty five of said definitions onto three hundred and sixty five of said tags.

12. The method of claim 11 further comprising the step of:
   removing said selected one of said imprinted tags and replacing said selected one with a new tag selected from said imprinted tags on a daily basis, to introduce a new word and definition daily.

13. A key set and educational aid for convenient and self-paced education, comprising:
   a spirally wound resilient metal key ring having a full turn of metal and an additional wrap of metal overlapping said full turn, thereby forming a region of overlap between said full turn and said additional wrap, said full turn and said additional wrap resiliently biased into contact with each other within said region of overlap;
   a key having a lock engaging body and a head engaging said key ring, a hole passing through said head through which said additional wrap may be passed by resiliently biasing said full turn and said additional wrap temporarily apart from each other and passing said additional wrap through said hole; and
   a plurality of planar paper-based tags, each of standard key size having a hole passing through said tag through which said additional wrap may be passed by resiliently biasing said fill turn and said additional wrap temporarily apart from each other and passing said additional wrap through said tag hole, and further having a word on a first major surface and a definition of said word on a second major surface of said planar tag opposed to said first major surface;
   said key, key ring and at least one of said plurality of planar tags operatively retained to each other;
   wherein said key, key ring and said at least one of said plurality of planar tags are operatively transportable through the elements.

* * * * *